United States Patent [19]

Tokar et al.

[11] Patent Number: 4,647,373
[45] Date of Patent: Mar. 3, 1987

[54] MULTI-LAYERED FILTER APPARATUS

[75] Inventors: Joseph C. Tokar, Apple Valley; William J. Krisko, Eden Prairie, both of Minn.

[73] Assignee: Donaldson Company, Inc., Minneapolis, Minn.

[21] Appl. No.: 646,585

[22] Filed: Aug. 30, 1984

[51] Int. Cl.[4] .............................................. B01D 27/06
[52] U.S. Cl. ................................... 210/232; 210/338; 210/387; 210/493.4; 210/497.1; 55/353; 55/520; 55/521
[58] Field of Search ............... 210/791, 232, 297, 315, 210/332, 337, 338, 342, 387, 493.1, 493.4, 314, 497.1; 55/520, 521, 485, 489, 529, 422, 474, 351, 353

[56] References Cited

U.S. PATENT DOCUMENTS

| 2,239,950 | 4/1941 | Berg | 55/447 |
| 2,463,723 | 3/1949 | Spraragen | 55/482 |
| 2,522,563 | 9/1950 | Dahlman | 324/95 |
| 2,675,127 | 4/1954 | Layte | 55/498 |
| 2,784,801 | 3/1957 | Lunde | 55/505 |
| 3,210,229 | 10/1965 | Feine | 210/489 |
| 3,368,687 | 2/1968 | Ruschman | 210/493.1 |
| 3,415,384 | 12/1968 | Kasten | 55/486 |
| 3,417,551 | 12/1968 | Bonell | 210/493.1 |
| 3,488,928 | 1/1970 | Tarala | 55/510 |
| 3,494,114 | 2/1970 | Nelson et al. | 55/498 |
| 3,710,588 | 1/1973 | Martinez | 55/354 |
| 3,884,658 | 5/1975 | Roach | 55/345 |
| 4,074,985 | 2/1978 | Willas | 55/498 |
| 4,172,797 | 10/1979 | Robichaud et al. | 210/493.1 |
| 4,235,609 | 11/1980 | Garigioli | 55/498 |

FOREIGN PATENT DOCUMENTS 2577482 8/1983 Japan .
357990 10/1931 United Kingdom .

Primary Examiner—Benoît Castel
Assistant Examiner—Wanda L. Millard
Attorney, Agent, or Firm—Merchant, Gould, Smith, Edell, Welter & Schmidt

[57] ABSTRACT

A renewable, multi-layered filter apparatus (20) is disclosed. The filter apparatus (20) includes a housing (22) having a fluid inlet (24) for ingress of a contaminated fluid flow and a fluid outlet (26) for egress of a filtered fluid flow. A filter element (28) is supported intermediate of the fluid inlet (24) and the fluid outlet (26). The filter element (28) includes a nested, pleated filter media (30) having multiple filter media layers (30a,b,c) which are independently removable from the filter element (28) so as to enable renewal of the filter function by simply removing one of the filter layers (30a,b,c).

13 Claims, 12 Drawing Figures

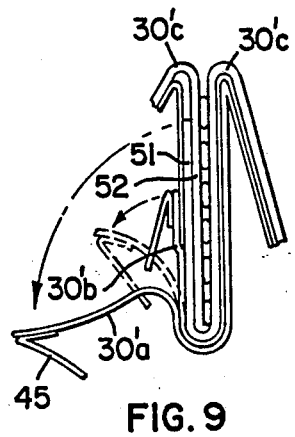
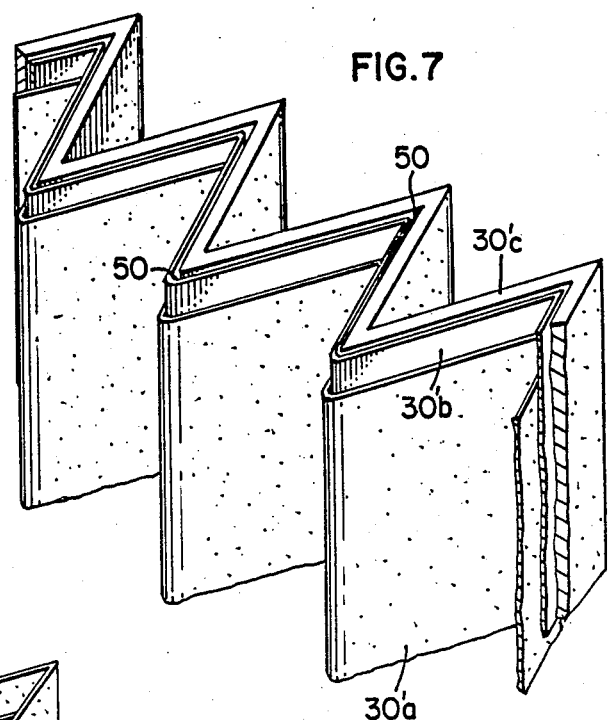
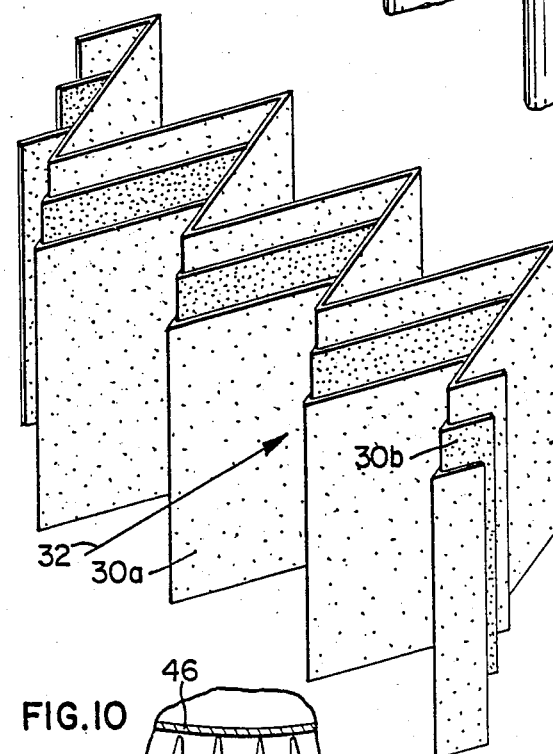
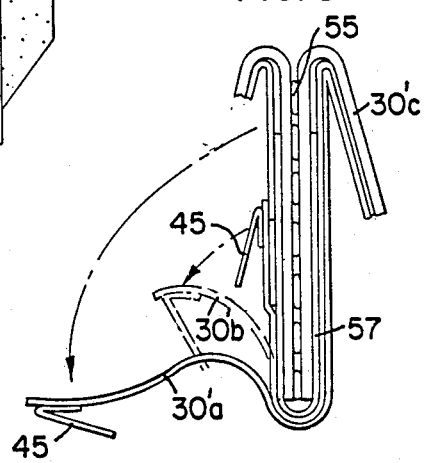
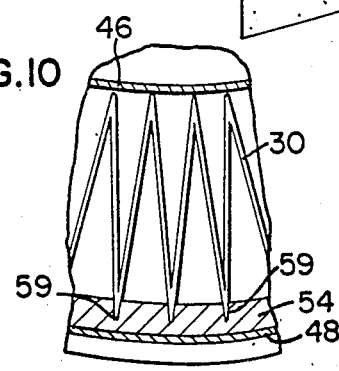

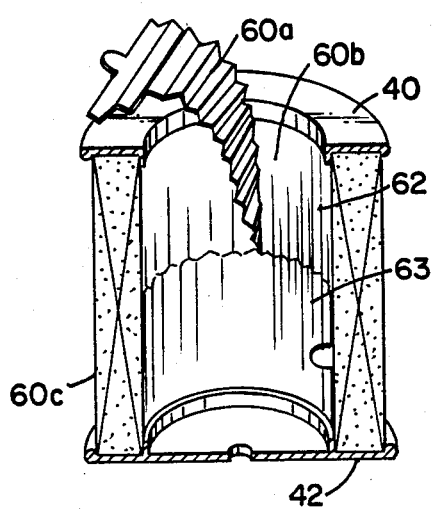 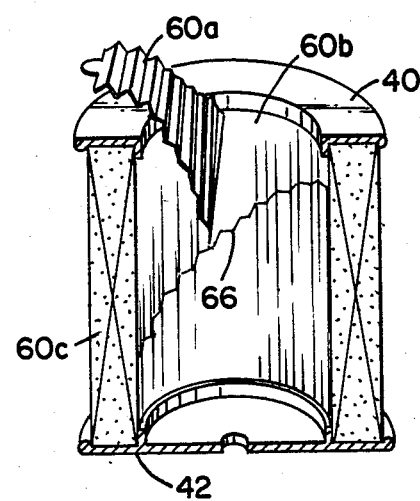

MULTI-LAYERED FILTER APPARATUS

BACKGROUND OF THE INVENTION

The present invention relates to a multi-layered filter apparatus. More particularly, the present invention relates to a multi-layered filter apparatus wherein various ones of the layers are individually removable so as to provide a filter apparatus wherein an individual layer can be removed so as to expose an unused layer thereby renewing the filter function of the filter apparatus.

Filter apparatus utilizing barrier-type filters have long been used for removing foreign materials and particulate from a contaminated fluid such as the intake air of an internal combustion engine. However, after a period of use, the function of the filter apparatus is substantially impaired to the point of being non-functional due to particulate and other foreign material being collected on the filter barrier surface. As a result, there have been developed several different methods for replacing a filter apparatus after its useful life has elapsed. For example, in some cases the entire filter apparatus is disposed of and a new one positioned in its place. In yet others, only the filter barrier media is exchanged. In still others, the filter media is washed for reuse. These approaches present problems in handling of the filter apparatus during the replacement process and/or are expensive to maintain as most if not all of the parts of a filter apparatus are disposed of.

The present invention solves these and many other problems associated with currently available filter apparatus.

SUMMARY OF THE INVENTION

The present invention relates to a filter apparatus constructed and arranged so as to be renewable at least once. The filter comprises a housing including inlet means for ingress of a contaminated fluid flow and outlet means, separate from the inlet means, for egress of a filtered fluid flow. A filter element is included for providing a single passageway for fluid flow from the inlet means to the outlet means, the filter element being positioned intermediate of the inlet means and the outlet means and constructed from a pleatable filter media and having a depth. The filter media includes a first layer and a second layer. The first layer is positioned upstream from the second layer with respect to the direction of a fluid flow therethrough which is in a downstream direction. The layers are constructed so as to nest together across the filter element depth. Means, integral with the filter media, is included for removing the first layer from the filter element so as to leave the second layer intact within the filter element.

The present invention provides a filter apparatus with a substantially increased useful life. The filter function can be renewed throughout the filter's lifetime by simply pealing off the first layer from the secod layer of the filter media so as to expose the unused second layer. This facilitates ease and regularity of filter maintenance. In addition, the filter apparatus of the present invention provides a filter apparatus with multiple layers such that when the first layer is removed, a clean second layer is exposed without any streaking. This enhances the overall appearance of the filter apparatus. Further, the multiple layer configuration will retain its configuration better than a single layer filter.

In the preferred embodiment of the present invention, the filter media is perforated in a pre-determined pattern, so as to enable the filter layers to be readily separated from one another and the filter element.

Also, in one embodiment of the present invention, the filter layers are nested concentrically with respect to each other so as to provide a cylindrical configuration.

In yet another embodiment of the present invention, the filter layers are arranged in a spiral-wrap fashion with respect to each other so as to enable easy removal, particularly wherein a cylindrical reverse flow filter apparatus is utilized.

These and various other advantages and features of novelty which characterize the invention are pointed out with particularity in the claims annexed hereto and forming a part hereof. However, for a better understanding of the invention, its advantages, and objects attained by its use, reference should be had to the drawings which form a futher part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

FIG. 4 is a partial enlarged perspective view of three filter layers in a pleated, nested configuration;

FIG. 7 is a partial enlarged perspective view of an alternate embodiment of a configuration of the filter layers;

FIG. 8 is a partial sectional view illustrating a structure for bonding to one another the layers shown in FIG. 7;

FIG. 9 is a partial sectional view illustrating an alternate structure for bonding to one another the layers shown in FIG. 7;

FIG. 10 is a partial sectional view illustrating an alternate embodiment utilizing a foam strip to maintain the spacing between pleated portions of the filter media;

FIG. 11 is a sectional, elevational view of an alternate embodiment of the present invention with a first filter layer being partially removed; and, FIG. 12 is a sectional, elevational view of yet another embodiment of the present invention with a filter layer being partially removed.

DETAILED DESCRIPTION OF A PREFERRED EMBODIMENT

Figure 1:
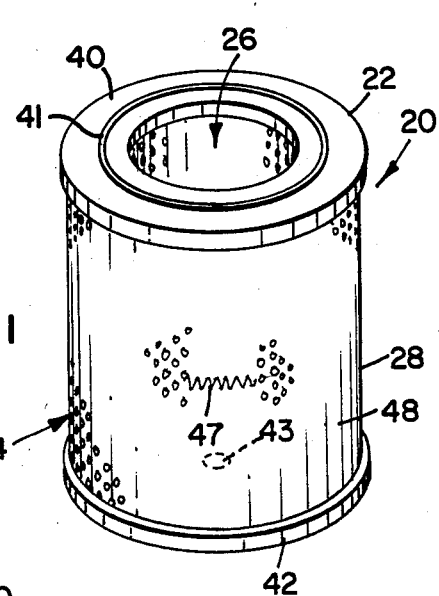
FIG. 1 is a view in perspective of an embodiment of a filter apparatus in accordance with the principles of the present invention.
Figure 2:
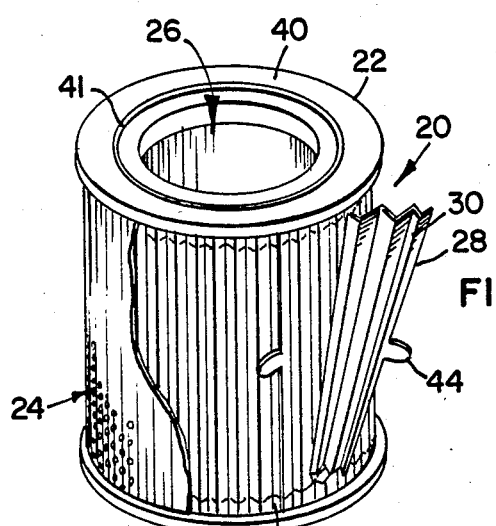
FIG. 2 is a view in perspective of the embodiment illustrated in FIG. 1 with portions broken away and the first filter layer being partially removed.
Figure 3:
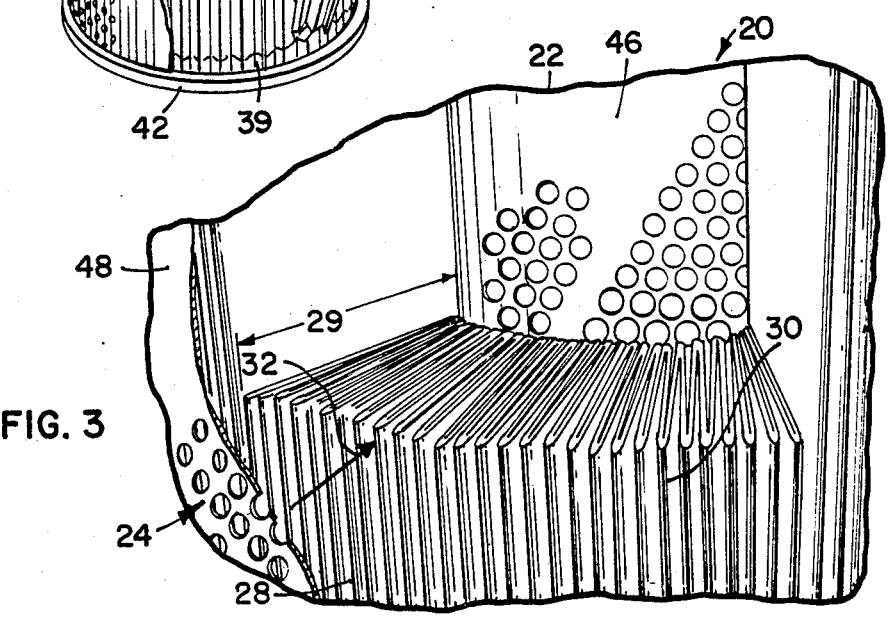
FIG. 3 is an enlarged fragmentary view of the embodiment illustrated in FIG. 1 with a portion of the filter media cut away so as to illustrate the nested, pleated configuration of the filter layers.

Referring now to the drawings, there is illustrated in FIGS. 1 through 3 a preferred embodiment of a multi-layered filter apparatus, generally designated by the reference numeral 20, in accordance with the principles of the present invention. The filter apparatus 20 facilitates removal of particulate and the like from a flow of contaminated fluid and is particularly useful in filtering intake air of internal combustion engines. The filter apparatus 20 includes a housing 22 having a fluid inlet 24 for ingress of a contaminated fluid flow and a fluid outlet 26, separate from the fluid inlet 24, for egress of a filtered fluid flow. A filter element 28 is supported by the housing 22 intermediate of the fluid inlet 24 and the fluid outlet 26, the filter element 28 providing a single passageway for the flow of fluid through the filter apparatus 20 from the fluid inlet 24 to the fluid outlet 26. In the embodiment illustrated in FIGS. 1 through 3, and more particularly in FIG. 4, the filter element 28 includes a pleated filter media 30 having multiple filter media layers 30a, b, c providing a filter barrier in the fluid flow passageway for filtering out particulate and the like, the filter element 28 having a predetermined depth generally in the direction of fluid flow, the depth dimension being indicated by the reference numeral 29. The filter layers 30a, b, c are pleated and nested in the general direction of fluid flow with successive layers surrounding each other so as to provide the filter media 30 with the predetermined depth 29. The first and second layers 30a, b are positioned upstream from the third layer 30c with respect to the direction of fluid flow as generally designated by the arrows 32. The first and second layers 30a, b are individually removable from the filter element 28.

Figure 5:
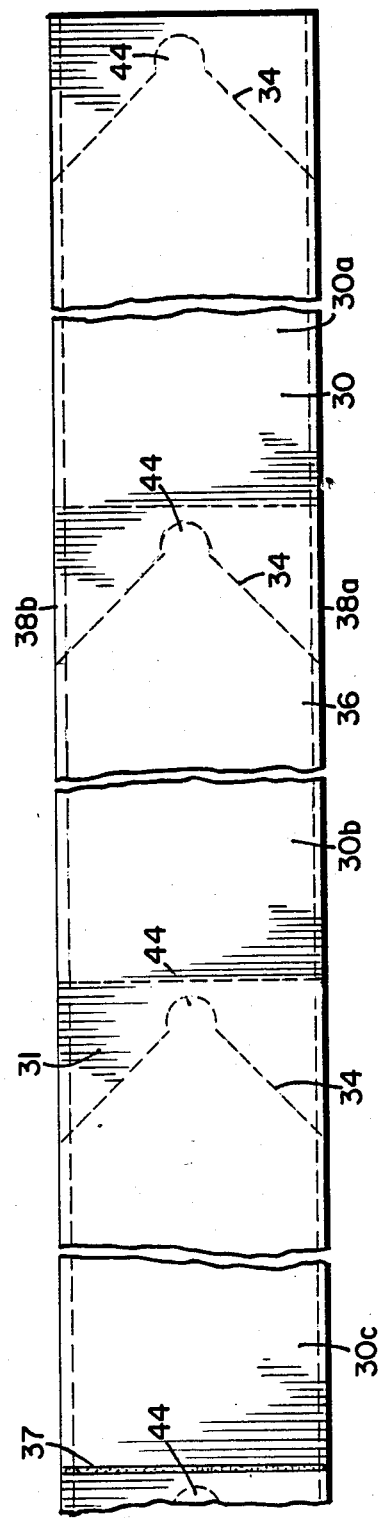
FIG. 5 is a plan view of a continuous filter media sheet perforated in a predetermined pattern to enable removal of individual filter layers.

As illustrated in the embodiment shown in FIG. 5, the filter media 30 might be formed from a continuous, pleatable planar sheet of the filter media 30 which is scored as indicated by the score lines 31 to facilitate pleating of the media 30 and is perforated in a predetermined pattern to enable separation of the filter media into sections corresponding to the filter layers 30a, b, c. The perforated pattern includes spaced wedge-shaped perforations 34 extending generally transversely of the media 30 forming tab portions 44 and perforations 36 slightly displaced from and extending longitudinally of side edges 38a, b of the filter media 30. The perforations 36 might only extend along those sections corresponding to the first and second layers 30a, b of the filter media since only those layers need be removable.

Figure 6:
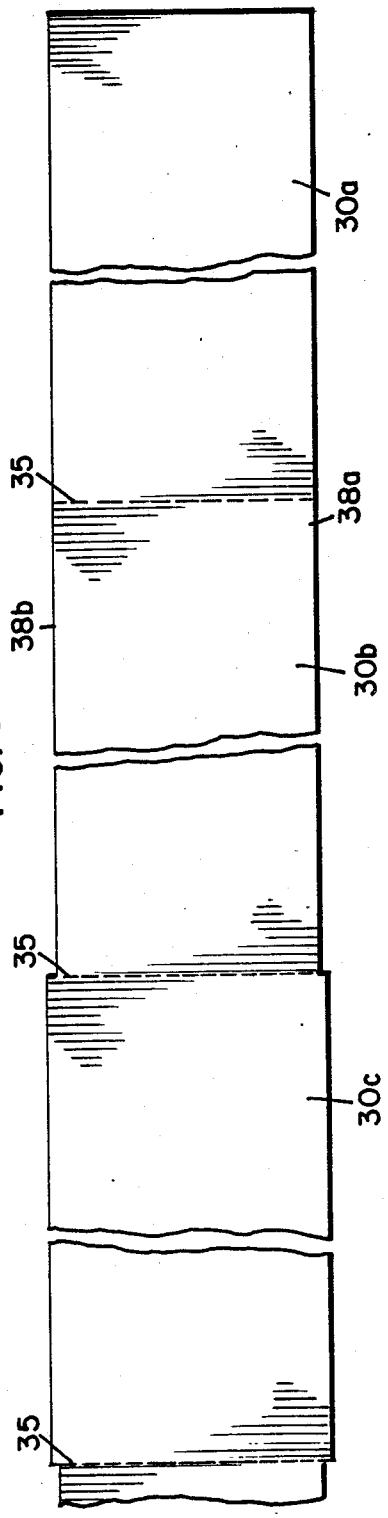
FIG. 6 is a plan view of an alternate embodiment of a continuous filter media sheet perforated in an alternate predetermined pattern with the two upstream filter layers being of lesser width than the downstream filter layer to enable removal of individual downstream filter layers.

To assemble the filter apparatus 20, the filter media 30 is pleated and then configured so as to be nested in a concentric, cylindrical fashion intermediate of an open end cap 40 and a closed end cap 42 of the housing 22 so as to provide the multiple layer configuration, the end cap 40 including a gasket member 41 thereon for sealing purposes. The side edges 38a, b of the filter layers 30a, b, c are preferably secured to the opposing, facing surfaces of the end caps 40, 42 by a suitable sealing or potting material 39 so as to hold the filter layers 30a, b, c in place. The perforations 36 along the side edges 38a, b of the first and second layers 30a, b enable the layers 30a, b to be individually removed from the filter element 28 by pulling on the tab portion 44 of each respective filter layer. In addition, one or more seam seals 37 might be utilized to facilitate retaining the individual filter layers 30a, b, c together. While only one such seam seal is illustrated in FIG. 5 for the filter layer 30c, it will be appreciated that the filter layers 30a, b might include a similar seam seal. In yet another embodiment as illustrated in FIG. 6, the layers 30a, b might simply be of a narrower width so that their side edges 38a, b are not sealed or potted as is the layer 30c, thereby enabling removal. In FIG. 6, perforations 35 separate the layers 30a, b, c while seam seals (not shown) might be utilized to releasably retain the layers 30a, b, c together.

Any number of methods can be utilized for seam sealing of the layers 30a, b, c to each other. For example, self-adhesive strips may be applied to the seam between adjacent layers 30a, b, c, a metal clip might be applied to the seam, the seam might be hot-melt bonded, a contact-type cement might be utilized, a plastic clip might be applied to the seam, etc.

In addition, the outer layers might be formed of separate and distinct filter layers which are simply stretched and pulled off one at a time.

Preferably, as illustrated, the filter apparatus 20 includes an inner, perforated cylindrical liner 46 suitably secured to the end caps 40, 42 and a removable, outer perforated cylindrical liner 48 so as to provide the added support typically required in a compression filter as shown. It will be appreciated that the removable outer liner 48 might be removably attached to the filter apparatus by any number of methods such as by use of an outer elastic band surrounding the removable outer liner 48, a spring member interconnecting the adjoining two ends of the outer liner 48, a suitable clip, etc. which are accessible to the user to enable removal of the outer liner 48. The outer liner 48 can itself be constructed from a piece of perforated sheet metal bent to concentrically surround the filter media 30. As illustrated by the embodiment in FIG. 1, the ends of the outer liner 48 are releasably retained by a spring member 47. As further illustrated in FIG 1, the closed end cap 42 might include a mounting aperture 43 adapted to receive a securing member (not shown) for securing the filter apparatus 20 in a suitable container or the like.

Yet another embodiment of the filter layers 30'a, b, c in accordance with the present invention is illustrated in FIG. 7. The removable layers 30'a, b are made from a thin layer media, such as a spun-bonded polymer, whereas the permanent layer 30'c is made from a substantially higher basis weight media so as to provide sufficient support and rigidity for maintaining the pleated, nested configuration of the filter layers 30'a, b, c. This embodiment further reduces the occurrence of air gaps or channels at the locations 50 along the filter media due to the capability of the thin flexible layers 30'a, b to readily configure themselves to fill in any gaps or spacing between the respective layers thereby reducing the likelihood that streaking will occur on the inner layers. Accordingly, when an upstream layer is removed, the underlying layer will have a clean, uniform appearance free of streaking.

As illustrated in FIG. 8, the layers 30'a, b, c might be discontinuous sheets interconnected to one another by a differential bonding proximate their ends which enables one layer at a time to be stripped away as opposed to being formed from a perforated continuous sheet. Therefore, to remove one of the layers 30'a, b, the user simply grasps a tab portion 45 and pulls on the end of the respective layer to be removed. The tab portions 45 might be color-coded or marked so as to indicate the point of removal. As illustrated, the downstream layer 30'c might be sealed end for end by an adhesive 55 and a U-shaped clip 57. An alternate structure for sealing the adjacent ends of the downstream layer 30'c is illustrated in FIG. 9 wherein the loose ends 51, 52, of the layer 30'c are overlapped and attached by use of the adhesive 55. It will be appreciated that numerous other structures might be utilized to attach the loose ends of the layer 30'c and attach the layers 30'a, b to each other so they are individually removable.

In yet another embodiment of the present invention as illustrated in FIG. 10, the removable outer lining 48 might include a foam pad strip 54 on the inside wall for engaging ends 59 of the individual pleats so as to maintain uniform spacing therebetween.

It will be appreciated that the present invention has utility with any number of a configuration of filter apparatus. For example, as illustrated in FIGS. 11 and 12, the present invention might also be utilized with a reverse flow filter apparatus as opposed to the standard flow filter apparatus hereabove described. In the reverse-flow filter apparatus, the filter layers will be removed from the inside of the housing as indicated in FIGS. 10 and 11 wherein inner layer 60a is in a partial state of removal. In the reverse-flow filter, filter layers 60a, b are positioned on the upstream side of the outer filter layer 60c which preferably is permanently attached to the filter apparatus. As illustrated in FIGS. 10 and 11, the filter media might include a predetermined pattern of perforations designed to reduce the bulk of filter media which must be removed through the opening in the open end cap 40. This might be accomplished as shown in FIG. 10 by dividing each of the layers 60a, b into two separate sections 62 and 63. As illustrated in FIG. 11, the filter layers 60a, b might include tapered perforations 66 so as to provide a spiral effect when removing the layers 60a, b. It will be appreciated, that the layer embodiment shown in FIG. 7 particularly lends itself to the reverse flow filter apparatus as the layers 30a, b have reduced bulk for removal through the hole of the open end cap 40.

It will be further appreciated that while the preferred embodiment is illustrated as having three layers, a filter apparatus in accordance with the principles of the present invention might have two layers, wherein the layers are referred to as first and second layers, or more layers. Further, the present invention is not limited to a filter apparatus having a cylindrical configuration as illustrated. Also, while the filter element is illustrated as having a relatively slight depth compared to the overall depth of the filter apparatus, it will be appreciated that the depth of the filter element might vary depending on the particular application. Furthermore, any suitable barrier media might be utilized in keeping with the present invention. Also, while a compression-type filter apparatus has been illustrated, it will be appreciated that the present invention might be utilized with non-compression apparatus wherein the housing structure might vary substantially; for example, the outer removable liner 48 might not be present.

Any number of methods might be utilized to attach the media 30 to the opposing surfaces of the end caps 40, 42.

It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts within the principals of the invention, to the full extent indicated by the broad general meaning of the terms in which the appended claims are expressed.

What is claimed is:

1. A filter apparatus constructed and arranged so as to be renewable at least once, said filter comprising:
    a housing including inlet means for ingress of a contaminated fluid flow and outlet means, separate from said inlet means, for egress of a filtered fluid flow;
    a filter element providing a single passageway for fluid flow from said inlet means to said outlet means, said filter element being positioned intermediate said inlet means and said outlet means and constructed from a pleated filter media and having a depth, said filter element including a first layer of said filter media and a second layer of said filter media, said first layer being positioned upstream from said second layer with respect to the direction of a fluid flow therethrough which is in a downstream direction, said first and second layers constructed so as to nest together across said filter element depth; and
    means, formed integral with said filter media, for removing said first layer from said filter element leaving said second layer intact within said filter element.

2. The filter of claim 1, wherein said second layer is formed continuous with said first layer.

3. The filter of claim 2, wherein said layer removing means includes a portion of said media being perforated in a pre-determined pattern, with said first layer being manually separable from said second layer along said pattern and removable from said element.

4. The filter of claim 1, wherein said filter element is constructed so that said layers are nested concentrically with respect to each other.

5. The filter of claim 1, wherein said filter element is constructed with said layers arranged in a spiral-wrap fashion with respect to each other, spaced apart side edges of said layers extending toward and away from the inlet and outlet means.

6. The filter of claim 1, further including means for sealing said second layer relative to said inlet means and said outlet means.

7. A filter constructed and arranged so as to be renewable at least once, said filter comprising:
    a housing including inlet means for ingress of a contaminated fluid flow and outlet means, separate from said inlet means, for egress of a filtered fluid flow;
    a filter element providing a single passageway for fluid flow from said inlet means to said outlet means, said filter element being positioned intermediate said inlet means and said outlet means and constructed from a pleated filter media and having a depth, said filter element including a first layer of said filter media and a second layer of said filter media, one of said first and second layers positioned so as to surround the other of said first and second layers, said first layer being positioned upstream from said second layer with respect to the direction of a fluid flow therethrough which is in a downstream direction, said first and second layers constructed so as to concentrically nest together across said filter element depth;
    means, formed integral with said media, for removing said first layer from said element leaving said second layer intact within said element, said means including a portion of said media being perforated in a preselected pattern, with said first layer being manually separable from said second layer along said pattern; and means for sealing said second layer relative to said inlet means and said outlet means.

8. The filter of claim 7, wherein said second layer is made from a higher basis weight media than said first layer, said second layer being formed separate and distinct from said first layer, said first and second layers being releasably secured to one another.

9. The filter of claim 7, wherein said first and second layers have spaced apart side edges extending longitudinally thereof, the side edges of said second layer being spaced father apart than the side edges of said first layer whereby said first layer has a lesser width than said second layer, the filter apparatus including means for sealing said side edges of said second layer relative to said inlet means and said outlet means.

10. A filter constructed and arranged so as to be renewable at least twice, said filter comprising:

a housing including inlet means for ingress of a contaminated fluid flow and outlet means, separate from said inlet means, for egress of a filtered fluid flow;

a filter element providing a single passageway for fluid flow from said inlet means to said outlet means, said filter element being positioned intermediate said inlet means and said outlet means and constructed from a pleated filter media and having a depth, a first, second, and third layer of said filter media being concentrically nested with respect to each other across the filter element depth, said first and second layers being positioned upstream from said third layer with respect to the direction of a fluid flow therethrough which is in a downstream direction, said first, second and third layers including side edges extending longitudinally thereof;

means for securing said third layer relative to said inlet means and said outlet means proximate said side edges of said third layer; and means formed integral with filter media for individually removing said first and second layers from said filter element while leaving the remaining layers intact with said filter element.

11. The filter of claim 10, wherein said first and second layers are perforated in a preselected pattern, with said first and second layers being individually separable from said filter element along said preselected pattern.

12. The filter of claim 10, wherein said third layer is made from a higher basis weight media than said first and second layers.

13. The filter of claim 12, wherein said first and second layers are differentially bonded to said filter element for individually removing said first and second layers.

* * * * *

UNITED STATES PATENT AND TRADEMARK OFFICE
CERTIFICATE OF CORRECTION

PATENT NO. : 4,647,373

DATED : March 3, 1987

INVENTOR(S) : JOSEPH C. TOKAR, et al.

It is certified that error appears in the above-identified patent and that said Letters Patent is hereby corrected as shown below:

```
Col. 1, line 57, delete "secod" and insert --second--.
Col. 7, line 16, delete "father" and insert --farther--.
```

Signed and Sealed this

Tenth Day of May, 1988

Attest:

DONALD J. QUIGG

Attesting Officer

Commissioner of Patents and Trademarks